United States Patent [19]

Lee et al.

[11] Patent Number: 5,430,732
[45] Date of Patent: Jul. 4, 1995

[54] SATELLITE COMMUNICATION SYSTEM

[75] Inventors: Duan-Shin Lee, Princeton Junction; Bhaskar Sengupta, Cranbury, both of N.J.

[73] Assignee: NEC USA, Inc., Princeton, N.J.

[21] Appl. No.: 213,379

[22] Filed: Mar. 14, 1994

Related U.S. Application Data

[63] Continuation of Ser. No. 853,138, Mar. 18, 1992, abandoned.

[51] Int. Cl.[6] .............................................. H04B 7/14
[52] U.S. Cl. ................................. 370/95.1; 370/95.2; 340/825.08
[58] Field of Search ............ 370/85.2, 85.8, 95.1–95.3, 370/104.1, 110.1, 94.1, 94.2; 340/825.6–825.07, 825.08, 825.54

[56] References Cited

U.S. PATENT DOCUMENTS

| | | | |
|---|---|---|---|
| 3,848,093 | 11/1974 | Edstrom | 370/81 |
| 4,322,845 | 3/1982 | Fennel, Jr. et al. | 370/104 |
| 4,667,193 | 5/1987 | Cotie et al. | 340/825.8 |
| 4,683,531 | 6/1987 | Kelch et al. | 340/825.5 |
| 4,742,512 | 5/1988 | Akashi et al. | 370/96 |
| 4,829,297 | 5/1989 | Ilg et al. | 340/825.8 |
| 4,947,451 | 8/1990 | Nawata | 370/95.1 |
| 5,010,329 | 4/1991 | Nagakura | 340/825.8 |
| 5,012,469 | 4/1991 | Sardana | 370/95.3 |

OTHER PUBLICATIONS

Hahne et al., "Improving the fairness of DQDB Network," Proceedings of iNFOCOM '90, San Francisco, Jun. 1990.

*Primary Examiner*—Douglas W. Olms
*Assistant Examiner*—Chau T. Nguyen
*Attorney, Agent, or Firm*—Arthur J. Torsiglieri

[57] ABSTRACT

A satellite communication system increases its efficiency by using adaptive pipeline polling as the control protocol. In this protocol, the earth stations are separated into active and inactive sets and a first number of slots (salary) is assigned to each active station. Additionally, periodically active stations are queried as to the length of their queues and assigned salary slots not needed by any active station are reallofted to stations with queues that exceed their assigned salary in proportion to the size of such excess. A contention period is included outside of the normal salary and bonus periods during which stations in the inactive are allowed to contend to be included in the active set.

5 Claims, 4 Drawing Sheets

SATELLITE COMMUNICATION SYSTEM

This is a continuation of application Ser. No. 07/853,135 filed Mar. 18, 1992, now abandoned.

FIELD OF THE INVENTION

This invention relates to a satellite communication system in which the signal is transmitted in the form of packets.

BACKGROUND OF THE INVENTION

A satellite communication system typically includes a satellite and a plurality of earth stations that communicate with one another by way of the satellite which receives a signal from a sending earth station and transmits the signal to a receiving earth station. Generally, the system includes a control processor which serves to control the time at which any one station is permitted to send since the satellite is time-shared by a number of earth stations. Typically, the control processor is located on earth although it can be located on the satellite.

Various protocols have been used in the past to control the times at which each station is permitted to send.

One basic protocol is to allow random access in a contention process. The first station to seize control when the system is otherwise idle is allowed to transmit, either as long as it wishes, or for a prescribed interval. However, such a system is not efficient during periods when many stations are seeking to transmit at about the same time. A number of variants of this contention type protocol have been proposed to improve this basic approach but each variant tends to retain the fundamental problem that in heavy traffic some stations may experience difficulty in getting any access to send in a reasonable time.

Another basic protocol depends on a reservation process in which each station is allotted a reserved period in which it alone can send. This protocol is inefficient when many of the stations have so little to send much of the time that most of their reserved periods are wasted.

Recently, there have been proposed protocols which combine features of the basic contention protocol and the basic reservation protocol. A system of this kind of particular promise is described in U.S. Pat. No. 4,742,512 which issued on May 3, 1988 to F. Akashi et al.

In this system, polling signals are transmitted by way of the satellite to each earth station in turn on the broadcast channel from a control center that is responsible for controlling access to the satellite, and begins by polling cyclically each station for requests for reservations without awaiting a reply. A station requesting a reservation transmits its request to the control center on the multiple access satellite channel. A second polling signal is then transmitted on the satellite broadcast channel from the control center to each requesting station in response to the reservation request and the multiple access satellite channel is reserved for a set period of time for the requesting station. Thereafter, at the appropriate time set by the reservation signal, the requesting station transmits to the satellite packets of information for the allotted time. While this mixed protocol offers significant advantages in both light traffic and heavy traffic conditions over pure reservation protocols, it still suffers inefficiencies when the traffic is quite nonuniform because it uses a "fixed window" scheme in which each station requesting a reservation is offered the same maximum so that an extremely heavy user gets no better treatment than a merely heavy user.

The present invention seeks to improve the above described system.

SUMMARY OF THE INVENTION

The present invention utilizes a protocol that will be described as Adaptive Pipeline Polling (APP). This protocol also seeks to retain the best features of both contention and reservation protocols. Its basic feature is that it continuously uses queue information from all the earth stations to allocate channel capacity to only those stations having packets to transmit and to adjust within limits the amount of capacity allocated to each such station in accordance with the size of the queue of packets awaiting transmission at such station.

In particular, APP initially divides the number of ground stations into an active set of stations then having packets to transmit and an inactive set of stations then having nothing to transmit. The members of the inactive set participate periodically in a contention process that can result in a transfer to the active set, as soon as they have packets to transmit. With respect to the stations then in the active set, the protocol works on the basis of a special form of reservation system.

There are two basic considerations in APP. First, APP adapts the size of the window to be allotted to each active station continuously on the basis of the number of active stations and the fixed transmission latency that has been determined to be desirable for the system at that time, where the transmission latency is the time taken to poll all the active stations in the system. For example, if, from a performance point of view, it seems desirable to keep the transmission latency to 500 packet slots and if there are twenty active stations at the time, the window size of each station should be twenty five slots.

A second consideration is the aim to adjust continuously the space in the channel allotted to an individual station per cycle to reflect the length of the traffic queue then at such station without unduly penalizing a station with a traffic queue of short length. Various arrangements for adjusting space allotted are possible to achieve this end.

A particular feature of the preferred embodiment of the invention is an allocation scheme that will be described as involving a salary and a bonus in which each active station is allotted as a maximum salary a basic or initial number of slots independent of the length of its queue but any slots not needed for this allotment are reallotted as a bonus to those stations in need of further any in proportion to their unfilled needs.

As a particular example, assume the transmission latency is chosen to be 300 slots and at a given time there are five active stations A, B, C, D and E with current queue lengths of 40, 50, 80, 90 and 100 slots, respectively. In this instance, the salary would be sixty slots (300 divided by 5). However, since stations A and B can provide thirty unused slots (20+10) these would be divided as bonuses between stations D, E and F in proportion to the 20, 30 and 40 slots still needed for such stations, or 7, 10, 13, respectively at that particular time. As a result, stations A, B. C, D, E would be allotted, 40, 50, 67, 70, and 83 slots, respectively. Accordingly, it is seen that this allocation scheme treats the heavy users largely in proportion to their needs while still insuring the light users an opportunity to transmit without long waits.

BRIEF DESCRIPTION OF THE DRAWING

The invention will be better understood from the more detailed description set forth below taken in conjunction with the accompanying drawing in which.

DETAILED DESCRIPTION OF THE INVENTION

Figure 1:
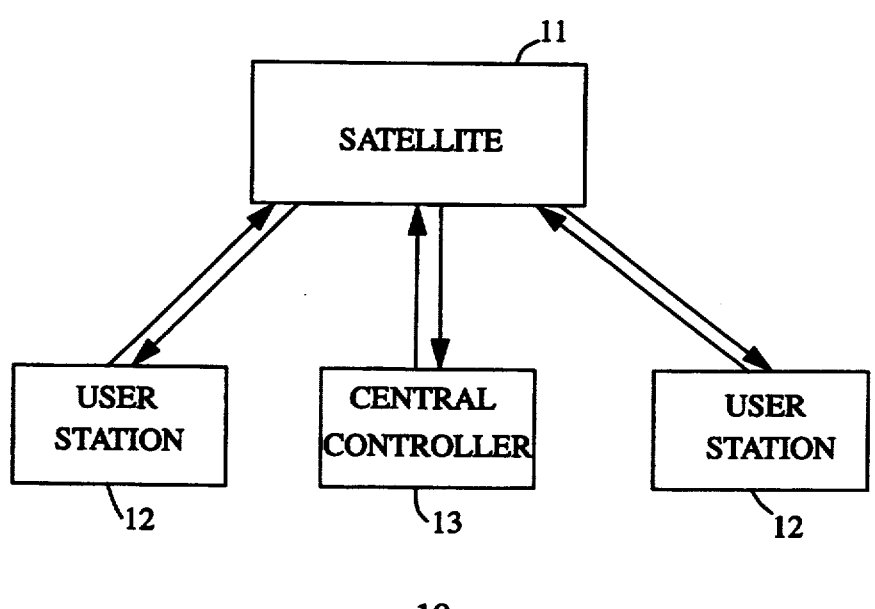
FIG. 1 shows in block schematic the basic subsystems of a satellite communication system.

FIG. 1 shows in block schematic form a satellite communication system 10 utilizing the principles of the invention. The system includes a communications satellite 11 that is particularly adapted for use in a packet transmission system. The satellite can be of a form conventional for use in such a system and would include a transponder that is adapted to receive uplink channels from any ground station 12 and to broadcast downlink channels back to any ground station 12 in the usual fashion. An illustrative ground station is described in more detail later with respect to FIG. 4.

The system further includes a control center 13, which essentially is a processor capable of providing control signals directly to the satellite and thereby indirectly to the various earth stations. In accordance with the invention, the control center functions in the manner necessary to realize the adaptive pipeline polling protocol previously discussed. The control center typically is located on earth because of the easier access there for maintenance and for changes in the protocol. An illustrative control center is described in more detail later with respect to FIG. 2. In other respects, the system can be basically the same as that described in the above identified patent.

Basically, the control center functions as follows:

Initially, it begins by querying individual earth stations in turn to ascertain the length, if any, of the traffic queue in such station and thereupon assigns individual stations appropriately to either the active or inactive set. It then determines the number of stations in the active set and divides the assigned latency period, which is a design parameter, by the number of active stations to determine the salary, or number of slots to be assigned initially to the each active station. It further determines the number of slots that will be available as a bonus by accumulating the unused slots of the salaries allotted to the active members. It then allots these unused slots to active stations with a unfilled demand for slots in proportion to the amount of unfilled demand.

After these preliminaries are complete, transmission of packet information from the active earth stations begins, with each active earth station transmitting in turn its traffic queue available for transmission up to its salary. After each active station has so transmitted, each active station that has been allotted a bonus transmits such bonus in turn.

It is generally desirable to complete all the salary transmissions before beginning the bonus transmissions, as described, to avoid timing problems. In particular, this allows the bonus computations and allotments to be done during the period of salary transmissions.

Finally, after completion of the salary and bonus transmissions and before a new cycle starts, there is a contention period in which those stations of the previously inactive set that have since developed a traffic queue and so wish to transfer to the active set are allowed to transfer. To transfer, a station transmits its wish to transfer, and if it succeeds in transmitting its request will receive an acknowledgement from the control station confirming the transfer. However, if two or more stations are transmitting at a given time, none will succeed and so none will receive an acknowledgement signal. In contention systems of this kind, there is generally included in a time-out circuit that determines whether a given station will try again in that contention period or wait until the next contention period. Various techniques have been developed to insure that no station is shut out indefinitely in contention processes of this kind. The length of this contention period is a design parameter and is chosen to permit a station which suddenly develops a traffic queue an opportunity to transmit without an unreasonably long wait. The various ground stations, the control center and the satellite can basically be of the same kinds as are described in the earlier identified patent after suitable modification to permit the functions necessary for practice of the present invention.

The operation of the system in more detail proceeds as follows.

When the system is first turned on and nothing is known a priori about the queue, if any, at each station, the control center would allot a nominal salary to each station and begin by sending a polling signal allotting such nominal salary in turn to each station. Each station upon receipt of the polling signal addressed to it would transmit for the nominal salary period, if it had a queue long enough to exhaust this period, followed by information as to the length of its queue. Any station with nothing to send would be idle during the period allotted to it. After the polling of all the stations, there would be an idle period that later will serve as the contention period, during which the control station can do the various processes of counting the number of active stations, calculating the maximum salary for all the active stations, determining the slots available for bonuses (because such maximum salary is not needed at same active stations) and allocating the bonus to each the active station in accordance with the principles described. At the end of such processing, the control station will send a polling signal on the broadcast channel to the first station on the active list allotting to it as much of the fixed salary as was warranted, based on the queue information previously sent. After receipt of the polling signal, the station will transmit on the satellite channel for the salary period allotted it and for an additional allotment period during which it sends information as to its remaining queue. The control station knowing the length of time this first station will transmit, will send a polling signal on the broadcast channel to the second station on the list, timed to permit the second station to begin transmitting on the satellite channel soon after the earlier station has completed transmitting. The second station like the first station, will transmit on the satellite channel for the allotted salary period followed by the queue information period. This operation continues until each active station has been allowed to transmit for that portion of the salary period that it had packets for and for its queue information period. At the end of such time, the control station starts a new round and by polling in turn each station to which it has allotted a bonus and allowing such station to transmit for such allotted bonus period. Once this round has been completed, there follows the contention period in which stations already on the active list are idle while stations on the inactive list contend to send out the information that they wish to be added to the active list. The control station takes note of this wish and in the next cycle will include it on its active list and so in the next salary transmission period, it will include such station permitting it to transmit, typically allotting it for this initial transmission only enough slots for the station to transmit its queue information. Thereafter, such station is treated like any other station on the active list. Alternatively, the process might provide instead that during the contention period, a station in contention transmit not only its wish to be on the active list but also the length of its queue so that it can be treated like any other station on the active list in the next cycle. This alternative would put extra demands on the speed with which the processor needs to accomplish its control functions.

The various requirements for APP to work include the following.

The length of the polling cycle in slots needs to be larger than the total number of ground stations.

The number of stations that are allowed to drop out of the active set in a cycle is a design parameter that is set to insure that the latency period for each ground station (the interval between the beginning of the salary period in two successive polling cycles) is greater than the round trip transmission delay. This also insures that the transmission latency will not become too small too quickly. To this end, the number of ground stations that are dropped from the active set for transfer to the inactive set in one cycle should be limited. In a poll to these stations a bit could be set so that a ground station being transferred knows this, if it has nothing to send in the current slot. This way such station knows that it must make its next reservation via the contention period.

Although the design of the various component subsystems needed for the practice of the invention should be straightforward there will be described in general terms illustrative embodiments of a suitable ground station and of a suitable control center.

Figure 2:
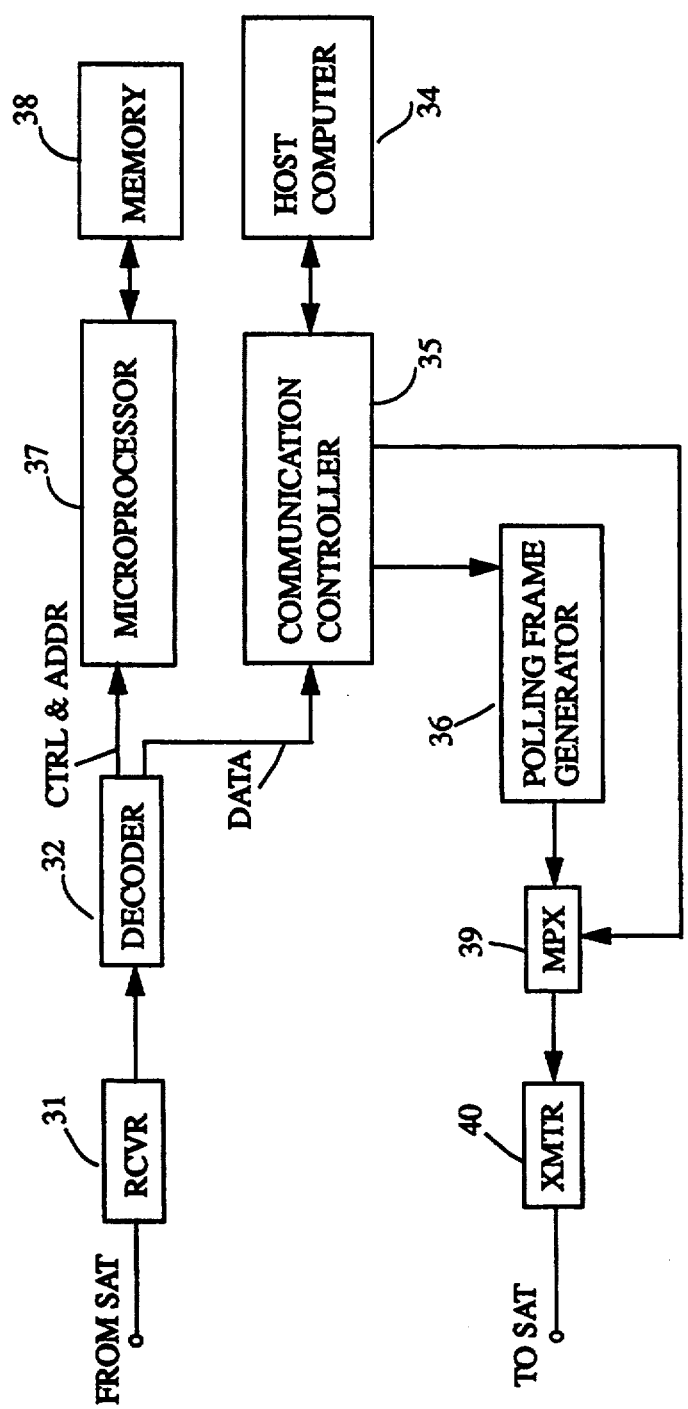
FIG. 2 shows in block schematic the basic components of a control station for use in a satellite communication of the kind shown in FIG. 1.

FIG. 2 shows the components of an illustrative control station or center 13 basic to provide the desired control operation of the satellite system circuits to provide timing and synchronizing generally are omitted. In particular, signals originating at the various earth stations are received from the satellite by way of receiver 31 and demodulated therein, and the relevant signals to be used by the control station are separated out and sent to the decoder 32. The decoder separates out any data information intended for the host computer 34, typically by way of the host computer interface 35, although this is apart from the control function. The control and address information needed for the control operation is also separated out by the decoder 32 and supplied to the microprocessor 37 which together with its memory 38 carries out the APP function.

The microprocessor 37 with the help of its stored program generates the polling and control signals for the control of access to the satellite as discussed earlier and supplies these to the host computer interface 35 where any special information may be added. The resultant then passes through to the multiplexer 39 for time division multiplexing on the carrier wave to be transmitted by transmitter 36 to the satellite. The microprocessor also supplies the timing and control signals for use by the frame generator 40 which generates the frames on which the control information is incorporated.

As indicated previously, each of these components is well known with the exception of the program used to control the microprocessor 37.

Figure 3:
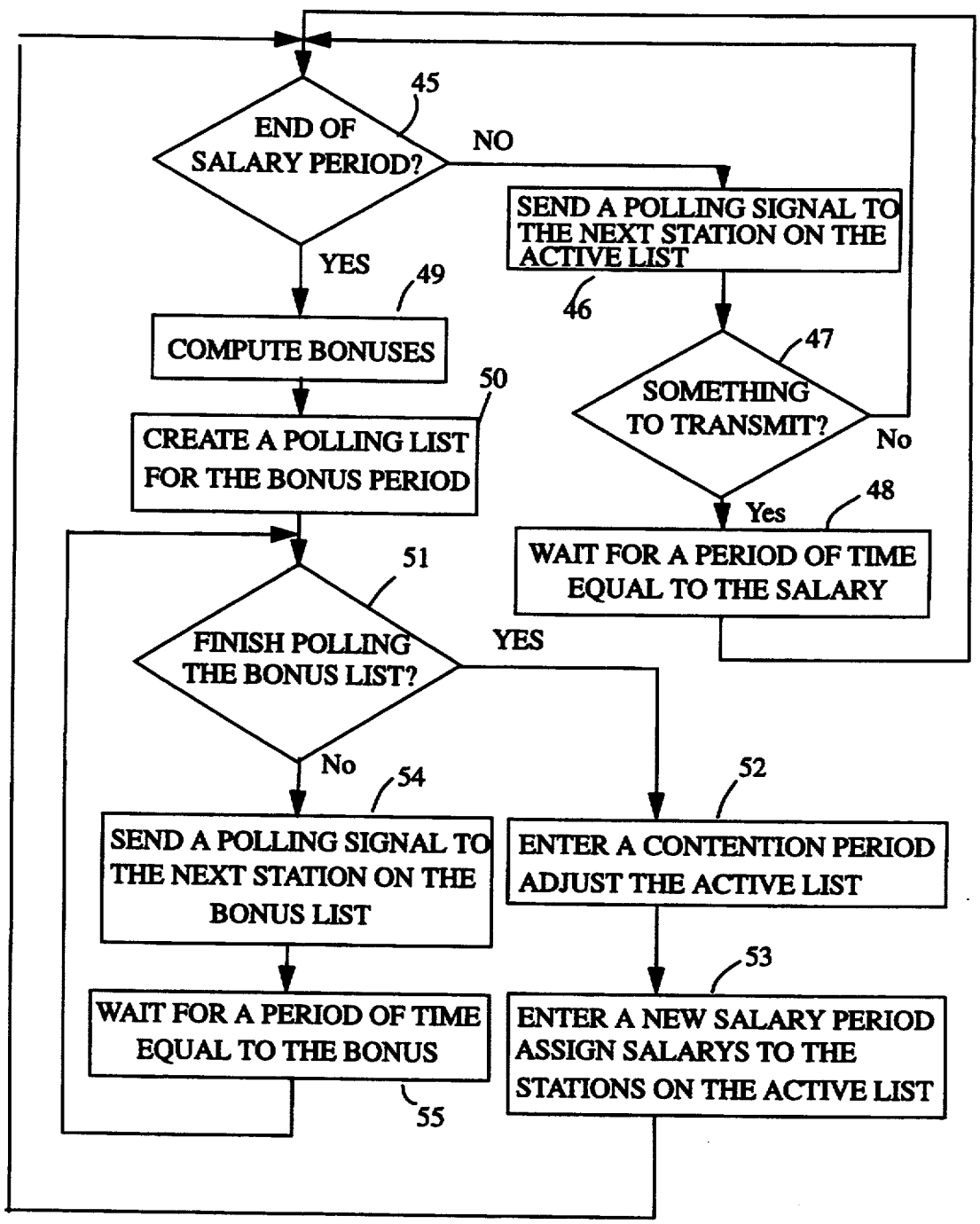
FIG. 3 is a flow chart of the basic steps of the program used to provide the control functions in the control station shown in FIG. 2 to realize a communication system in accordance with the invention.

FIG. 3 is a flow chart of the basic steps of the program used by the microprocessor to supply the salary and appropriate bonus to the separate ground stations. It generally would be stored in the memory 38 associated with the microprocessor 37.

Basically, the process is recursive and one can begin with step 45 of checking to find the end of a salary period. As long as the answer is no, per step 46 polling signals are sent to successive stations on the list of active stations. Per step 47, the central station begins by asking itself whether the station has previously indicated that it has something to send. If the answer is no, one returns to the starting point and checks whether it is the end of the salary period. If the answer to step 47 is yes, one waits a time equal to the salary period before returning to the starting point, as per step 48.

Once the answer to step 45 is yes and the salary period is over, per step 49 the bonuses are computed and per step 50 there is created a list of the active stations that are to be polled as possibly eligible to receive bonuses. Then, per step 51 there is checked whether this polling of the active stations on the bonus list is complete. When yes, per step 52 one enters the contention period where stations that were previously idle contend to become active. At the end of this contention period, per step 53 one starts a new salary period and assigns salaries to stations on the active list after which one returns to step 51. If the answer to step 51 is no, per step 54 a polling signal is sent to the next station on the bonus list to ascertain the length of its queue. Then, per step 55 there is a wait of the period of time equal to the bonus length before return to step 51 to recycle this part of the process.

Figure 4:
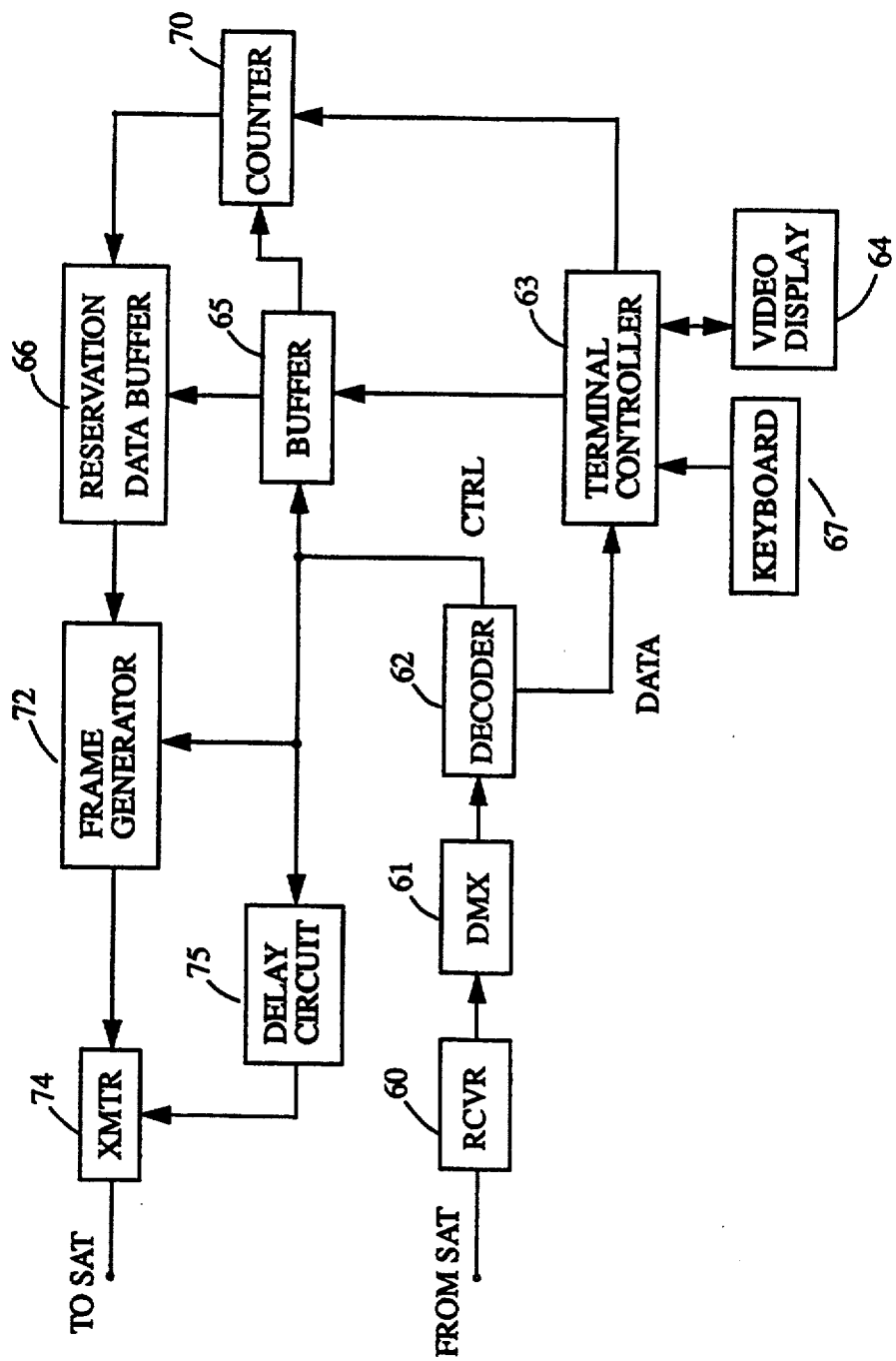
FIG. 4 shows in block schematic the basic components of an earth or ground station for use in a satellite communication system of the kind shown in FIG. 1.

FIG. 4 shows in block schematic form the basic components of an illustrative ground station 12 for use in the communication system shown in FIG. 1. As before, circuits for timing and synchronizing generally are omitted. As previously indicated, the ground station equipment may be of the type conventionally used in ground stations of satellite systems.

As illustrated, the signal from the satellite is picked up by the receiver 60 and demodulated and decoded in circuits 61 and 62, respectively, for recovery of the control and data information intended for this particular ground station in conventional manner.

The data information portion is passed on to the terminal controller 63 which adapts it for its intended use before passing it on to the output utilization apparatus 64, in this case shown as a video display for video signals. More typically, the information received would be introduced into a land line communication system for transmission to a local communication system for transmission to the user.

The control portion of the decoded signal, which includes information as to when and for how long this ground station will be permitted to transmit to the satellite, is passed on to the buffer 65 and used to monitor how many packets will be transferred from the buffer for storage in the reservation data buffer 66 for transmission when the time for transmission arrives. The buffer 65 is supplied with the packets to be sent that are to originate at this station by way of the terminal controller 63 from the particular input device, shown here for example as the keyboard 67. More typically, the packets to be sent represent information generated by a user remote from the ground station that is transmitted to the ground station by the land line from a local station.

The buffer 65 and the terminal controller 63 also apply information to the counter 70 which is used to control the frame generator 72 so that it will accumulate the number of packets to be transmitted on the next cycle. The packets to be transmitted are supplied to the frame generator 72 by the reservation data buffer 66 and it prepares them for transmission by the transmitter 74. The frame generator 72 is also supplied with control signals from the decoder 62. These control signals are also applied to the transmitter 74 by way of the delay circuit 75 which serves to compensate for the delay encountered by the packets to be transmitted in traversing the intermediate circuitry before they arrive at the transmitter. At the appropriate time determined by the control signals, the station transmits to the satellite on the multiple access satellite channel.

It can be appreciated that various modifications are possible consistent with the basic philosophy of the invention. For example, it may be unnecessary to include a contention period in each cycle but rather to include it less frequently, for example, only on every third cycle. Similarly, it would be unnecessary to include a contention period when all stations are active. Moreover, the length of the contention period might be made adjustable and dependent on the number of stations in the inactive list at a particular time, being made shorter the fewer the number of inactive stations at the time. Similarly, the allotment of bonus size on active station other then one linearly proportional to the size of the unfilled queue of the station can be used if desired, such as on one in which the age of the unfilled queue could be a factor.

What is claimed is:

1. In a satellite communication system that includes a plurality of earth stations that includes an active set with a queue of information to transmit and an inactive set with no queue of information to transmit and a satellite a control system for controlling cyclically the access of individual earth stations to the satellite for permitting the earth stations with information to transmit to transmit such information in turn, comprising means for cyclically querying each individual station in the active set for answers as to the length of its queue of packets awaiting transmission to the satellite, means based on the answers to the queries for calculating both a salary to be allotted in the cycle to each station in the active set and the total number of slots not needed in such cycle by the active stations because some of such stations have a salary that exceeds their queue, where the salary is the number of slots available for transmission in the cycle divided by the number of stations in the active set, and for apportioning among stations in the active set with queues in excess of their salary said total number of slots as bonuses, means for allowing in each cycle each station in the active set in turn first to transmit for the number of time slots that comprises its salary to the extent needed and thereafter for allowing each station in the active set in turn to transmit any bonus, and means operative periodically for allowing each station in the inactive set, after it has acquired a queue, to participate in a contention process by transmitting to the satellite a request for transfer to the active set and to transfer successful stations into the active set in the succeeding cycle.

2. A satellite communication system that includes a plurality of earth stations, a satellite and a control system for controlling access to the satellite by the earth stations for communication between one another, the control system comprising means for querying each earth station for answers as to the length of its queue of packets awaiting transmission, whereafter each earth station is initially assigned either to an active set of stations having a queue of packets awaiting transmission or to an inactive set of stations not having such a queue, and only the stations in the active set are queried in subsequent cycles, means using said answers for determining both the number of slots to be allotted in the next cycle to each station in the active set as salary, wherein the salary is the number of slots available for the transmission in the cycle divided by the number of stations in the active set, and also the total number of slots allotted as salary that will not be needed by the stations of the active set whose queues are less than their salaries, means for apportioning such unneeded slots as bonuses between stations in the active set that have queues longer than their salary in proportion to the excess, means for allowing each station in the active set to transmit in turn its queue up to length of its salary, means for thereafter allowing each station awarded a bonus to transmit in turn its bonus, and means for permitting periodically each station in the inactive set that has acquired a queue of packets to contend with other such stations for transfer to the active set and for transferring successful stations to the active set.

3. The satellite communication system of claim 2 in which the control system further comprises means for reclassifying into the inactive set a station in the active set that no longer has a queue to transmit.

4. For use in a satellite transmission system including a plurality of earth stations and a satellite, a process for controlling cyclic access by the earth stations to the satellite for transmission that includes the steps of querying initially each earth station in turn as to the length of its queue of packets and classifying each earth station either as active if it has a queue to transmit or inactive if it has no queue to transmit, determining for the next cycle a basic allotment of slots in the satellite for each active station by dividing the slots available for transmission in the cycle by the number of stations in the active set, determining for the cycle an extra allotment of slots in the satellite for each active station whose basic allotment is less than its queue by dividing among the stations with queues longer than their basic allotment the number of slots that had been allotted as basic allotment to active stations but that are not needed because some stations had queues less than their basic allotment.

allowing each active station access in turn to the satellite for transmission for as many slots of its basic allotment as it has packets in its queue, allowing thereafter each active station with an extra allotment access in turn to the satellite for transmission for the length of its extra allotment, periodically allowing stations that had been inactive but had now acquired a queue to contend for classification in the active set, and reclassifying any that succeed as in the active set, and reclassifying in the inactive set a station that had been in the active set after it no longer has a queue to transmit.

5. In a satellite communication system, a process for allocating cyclically time slots in the satellite to earth stations that have been classified as active with queues of packets to be supplied to the satellite for transmission to other earth stations that comprises the steps of querying each active station as to the size of its queue, dividing the number of time slots available in one cycle of transmission by the number of active stations to reach a salary number, calculating the total number of time slots that will be unused by those active stations whose salary number is larger than its queue and dividing this total number as a bonus among the active stations with queues in excess of their salary number in proportion to such excesses, allowing each station in the active set access in turn to the satellite for time slots equal to the lesser of its queue or its salary number, and then allowing each station in the active set with a queue in excess of its salary number access in turn to the satellite for time slots equal to its bonus.

* * * * *